(12) United States Patent
Roesel et al.

(10) Patent No.: US 10,876,452 B2
(45) Date of Patent: Dec. 29, 2020

(54) DEVICE AND METHOD FOR METERING WATER OR AN AQUEOUS SOLUTION IN A COMBUSTION SYSTEM

(71) Applicant: CONTINENTAL AUTOMOTIVE GMBH, Hannover (DE)

(72) Inventors: Gerd Roesel, Regensburg (DE); Wendelin Kluegl, Seubersdorf (DE)

(73) Assignee: Continental Automotive GmbH, Hannover (DE)

( * ) Notice: Subject to any disclaimer, the term of this patent is extended or adjusted under 35 U.S.C. 154(b) by 60 days.

(21) Appl. No.: 16/236,854

(22) Filed: Dec. 31, 2018

(65) Prior Publication Data

US 2019/0136735 A1  May 9, 2019

Related U.S. Application Data

(63) Continuation of application No. PCT/EP2017/060714, filed on May 4, 2017.

(30) Foreign Application Priority Data

Jun. 30, 2016  (DE) .................. 10 2016 211 826

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9431* (2013.01); *F01N 3/005* (2013.01); *F01N 3/206* (2013.01); *F02M 53/06* (2013.01); *H05B 1/00* (2013.01); *F01N 2240/16* (2013.01); *F01N 2610/02* (2013.01); *F01N 2610/10* (2013.01);
(Continued)

(58) Field of Classification Search
CPC ........ F01N 3/2066; F01N 3/206; F01N 3/005; F01N 2240/16; F01N 2610/02; F01N 2610/10; F01N 2610/1453; F01N 2610/1486; F02M 53/06; F02M 51/0682;
(Continued)

(56) References Cited

U.S. PATENT DOCUMENTS 7,654,080 B2    2/2010  Ripper et al.
9,322,314 B2    4/2016  Hodgson et al.
(Continued)

FOREIGN PATENT DOCUMENTS

CN    103620173 A      3/2014
DE    19743302 C1  *   2/1999  ......... B01D 53/9495
(Continued)

*Primary Examiner* — Matthew T Largi
(74) *Attorney, Agent, or Firm* — Laurence A. Greenberg; Werner H. Stemer; Ralph E. Locher

(57) ABSTRACT

A metering device for metering water or an aqueous solution, such as an injector for metering a reducing agent liquid into an exhaust gas stream of a combustion system or an injector for metering water or aqueous solution into a combustion chamber or into an intake manifold of an internal combustion engine. The metering device has an inlet and an outlet for the water or aqueous solution and a shut-off device which is arranged between the inlet and the outlet. At least one electrically operated heating element is arranged in the region of the shut-off device so as to heat and avoid freezing of the liquid.

9 Claims, 3 Drawing Sheets

(51) Int. Cl.
*F02M 53/06* (2006.01)
*F01N 3/00* (2006.01)
*H05B 1/00* (2006.01)
*F02M 51/06* (2006.01)
*F02M 25/022* (2006.01)

(52) U.S. Cl.
CPC .............. *F01N 2610/1453* (2013.01); *F01N 2610/1486* (2013.01); *F02M 25/0224* (2013.01); *F02M 51/0682* (2013.01)

(58) Field of Classification Search
CPC ... F02M 25/0224; B01D 53/9431; H05B 1/00
See application file for complete search history.

(56) References Cited

U.S. PATENT DOCUMENTS

| | | | | |
|---|---|---|---|---|
| 2005/0120708 A1* | 6/2005 | Ranalli | ................ | F01N 3/0842 60/283 |
| 2006/0118651 A1* | 6/2006 | Kaneko | ............. | F02M 61/1853 239/135 |
| 2009/0282814 A1* | 11/2009 | Stein | ................... | F01N 3/0253 60/286 |

FOREIGN PATENT DOCUMENTS

| | | | | |
|---|---|---|---|---|
| DE | 19743302 C1 | | 2/1999 | |
| DE | 102004054238 A1 | | 5/2006 | |
| DE | 102004062603 B3 | | 7/2006 | |
| DE | 102006025332 A1 | | 12/2007 | |
| DE | 102009015802 A1 | | 10/2010 | |
| DE | 102009032488 A1 | | 1/2011 | |
| DE | 102011077951 A1 | * | 12/2012 | ............. F01N 3/206 |
| DE | 102011077951 A1 | | 12/2012 | |

\* cited by examiner

DEVICE AND METHOD FOR METERING WATER OR AN AQUEOUS SOLUTION IN A COMBUSTION SYSTEM

CROSS-REFERENCE TO RELATED APPLICATION

This application is a continuation, under 35 U.S.C. § 120, of copending international patent application No. PCT/EP2017/060714, filed May 4, 2017, which designated the United States; this application also claims the priority, under 35 U.S.C. § 119, of German patent application No. DE 10 2016 211 826.9, filed Jun. 30, 2016; the prior applications are herewith incorporated by reference in their entirety.

BACKGROUND OF THE INVENTION

Field of the Invention

The invention lies in the field of combustion systems. More particularly, the invention pertains to a metering device and a corresponding method for metering a liquid, such as water or an aqueous solution in a combustion system. Yet more specifically, the invention relates to a metering device for metering a reducing agent liquid into an exhaust gas stream of a combustion system, for example into the exhaust gas tract of a motor vehicle, and to a metering device for injecting water of an aqueous solution into the combustion chamber or the intake manifold of a combustion engine. The invention furthermore relates to a method for operating such a metering device.

Metering devices, also referred to as injectors, which inject water and/or aqueous solutions in a combustion system, such as urea injectors that inject into the exhaust gas tract of a combustion system or injector that inject water into the combustion chamber of an internal combustion engine, are at risk of being destroyed when the internal combustion engine is shut down and there are external temperatures below the freezing point, as a result of freezing of the medium in the injector and the resulting expansion. In low-pressure injectors, which are used, for example, in SCR (selective catalytic reduction) systems, in particular the nozzle region of the injector is at risk, since in this region thickening of the material would result in performance disadvantages during atomization.

German published patent application DE 10 2004 054 238 A1 discloses removing the solution by sucking it back out of the injector as soon as the internal combustion engine is shut down. However, this is costly.

BRIEF SUMMARY OF THE INVENTION

An object of the present invention is to specify a metering device for metering a liquid (e.g., water or aqueous solution) in a combustion system, with which metering device damage to the metering device as a result of freezing of the liquid is prevented. It is furthermore sought to specify a method for operating such a metering device.

With the above and other objects in view there is provided, in accordance with the invention, a metering device for metering water or an aqueous solution, the metering device comprising:
 an inlet and an outlet for the water or aqueous solution;
 a shut-off device arranged between said inlet and said outlet; and
 at least one electrically operated heating element arranged in a region of said shut-off device.

According to one aspect of the invention, there is provided a metering device for metering a reducing agent liquid into an exhaust gas stream of a combustion system. In another aspect, the metering device is specifically configured as a liquid injector for injecting water or an aqueous solution into the combustion chamber or the intake manifold of an internal combustion engine. The metering device according to the invention has an inlet and an outlet for the liquid (e.g., reducing agent, water) and a shut-off device which is arranged between the inlet and the outlet. At least one electrically operated heating element is disposed so as to heat the region of the shut-off device.

The metering device is, in particular, an injector for injecting an aqueous solution, for example urea solution, into the exhaust gas tract of a motor vehicle for exhaust gas after-treatment. The metering device is also an injector for injecting water or an aqueous solution into the combustion chamber or the intake manifold of a combustion engine.

The electrically operated heating element can be, in particular, a low-energy heating device with a heating capacity of approximately 1 Watt. As has become apparent, such a heating capacity is sufficient to achieve an increase in temperature by 10 K of the water or aqueous solution in the region of the shut-off device. This is sufficient in the overwhelming majority of cases to prevent freezing of the liquid in the region of the shut-off device which is particularly at risk.

It has been shown that the injector tip and the cooling jacket have sufficiently high thermal resistance values, in particular in the case of water-air cooling of the injector, owing to small surfaces. As a result it is possible to keep the energy requirement of the heating element low, to such an extent that, for example, only 1% of the energy contained in a battery with 65 Ah/12 V (780 Wh) would have to be used within 8 hours for an increase in temperature of 10 K.

The metering device thus has the advantage that damage, in particular to the particularly sensitive region of the shut-off device can be protected against destruction resulting from freezing of the reducing agent or the water.

According to one embodiment, the at least one heating element is arranged in the region of a nozzle of the metering device. Such a nozzle is typically arranged in the form of a nozzle plate with holes in the region of the outlet of the metering device. Since the configuration of the nozzle is determined by the type of spray to be generated, thickening of the material at the nozzle plate in order to protect against damage as a result of freezing reducing agent or water is typically disadvantageous. Heating which takes place selectively in this region has the advantage that the particularly sensitive region of the nozzle is protected, without modifications having to be made to the nozzle plate.

According to a further embodiment of the invention, the at least one heating element is formed by virtue of the fact that in the region of the nozzle at least one housing element of the metering device is electrically insulated, and the housing element can be short-circuit-heated by applying an electric current. In the case of a urea injector, it is sufficient if the housing is insulated with respect to elements of the exhaust gas tract and the housing element can be short-circuited for heating the reducing agent.

According to this particularly simple embodiment, electrodes are provided on the housing of the metering device in the region of the nozzle, by means of which electrodes a flow of current can be generated directly through the housing. In this way, a flow of current through the nozzle plate or through housing elements in the direct vicinity of the nozzle is generated, and said housing elements are heated as a result. For this purpose, electrical contact is made with housing elements of the metering device which are electrically insulated with respect to the exhaust gas tract, and the connections are led out of the housing of the metering device and/or out of the exhaust gas tract.

This embodiment has the advantage that it is particularly simple because, apart from the electrical connections, no further elements are required to form the heating element.

According to an alternative embodiment, the at least one heating element is formed by virtue of the fact that a first electrode is led in the metering device as far as the vicinity of the nozzle, and a second electrode makes contact with a housing element of the metering device in the region of the nozzle, with the result that a current path is formed from the first electrode to the second electrode through the reducing agent liquid and the housing element. In one configuration, the first electrode is led into the metering device through the inlet.

In this embodiment, the electrical conductivity of the reducing agent (for example aqueous urea solution) is used, and a flow of current is generated through the reducing agent liquid in the direct vicinity of the nozzle. As a result, the reducing agent liquid is heated directly.

The second electrode, which makes contact with the housing element, is connected, in particular, to the vehicle ground.

Although this embodiment requires an electrode to be led through the metering device, apart from the electrical connections it also requires no further components and is therefore particularly simple in design. As a result of the direct heating of the reducing agent, the energy loss in this embodiment is kept low. In particular, a loss of heat via the metal flange which connects the injector to the exhaust gas tract is unproblematic.

According to a further embodiment, the at least one heating element is formed by virtue of the fact that at least one heating pellet is arranged in the region of the nozzle and contact is made therewith by at least one electrode which is led through the housing of the metering device as far as the heating pellet. A heating pellet is, in particular, an encapsulated heating element, e.g. an encapsulated PTC heating element (PTC=positive temperature coefficient).

In this embodiment, a heating pellet is provided for converting electric current into heat as a separate element, and is arranged in the particularly sensitive region of the nozzle, in order to heat it. Contact is made with the heating pellet by means of at least one electrode which is led, for example, between an external valve housing and an internal valve housing which has the cavity for holding the reducing agent liquid.

Therefore, the feed line does not run in a "wet" region of the metering device, so that no sealing problems occur.

The at least one heating pellet can be, in particular, embodied as an annular disk around the nozzle. This can be formed, for example, from metal or ceramic.

The metering device can be, in particular, a solenoid valve, i.e. a valve which can be actuated magnetically. Such valves are widespread for precise metering of liquids.

According to one aspect of the invention, an exhaust gas purification apparatus is specified for a motor vehicle, which exhaust gas purification apparatus has a container for holding and making available a liquid reducing agent, the described metering device for outputting the reducing agent into the exhaust gas stream, and a reducing agent line connecting the container to the metering device. In particular, a pump can be connected into the reducing agent line, for feeding reducing agent from the container into the exhaust gas tract of the internal combustion engine of the motor vehicle.

Such an exhaust gas purification apparatus can be used, in particular, for reducing nitrogen oxides in diesel vehicles. In this context, typically urea solution is used as the reducing agent liquid. However, it is also conceivable to use the exhaust gas purification apparatus for another type of motor vehicle and/or another type of reducing agent.

According to a further aspect of the invention, a method is specified for operating a metering device as summarized above. The metering device has an inlet and an outlet and a shut-off device which is arranged between the inlet and the outlet, wherein a region of the shut-off device is heated above a freezing point of the water or aqueous solution at least when the combustion system is inoperative. The method is specifically directed towards metering a reducing agent liquid into an exhaust gas of a combustion system, and also towards metering water or an aqueous solution into a combustion chamber or an intake manifold.

The method has the advantage that particularly safe operation of the metering device is possible even at low exterior temperatures. In particular, the metering device is protected against destruction by freezing liquid even when the combustion system is inoperative and therefore does not generate heat and thereby heat the metering device via the exhaust gas.

In this method there can be provision to heat a region of the shut-off device when the combustion system is switched off. It would also be possible additionally to check, in a method step before the heating and/or during heating, whether the external temperature is in a range which makes heating necessary, i.e. in particular to check whether the external temperature is lower than or equal to the freezing point of the reducing agent liquid, or whether the external temperature is less than a predefined value above the freezing point of the solution.

The heating is carried out here, in particular, electrically in that a flow of current through elements of the metering device or a heating pellet provided for this purpose brings about resistance heating.

In particular, the heating is carried out locally in the region of a nozzle of the metering device, which region is particularly at risk as a result of freezing of the reducing agent or the water.

Other features which are considered as characteristic for the invention are set forth in the appended claims.

Although the invention is illustrated and described herein as embodied in metering device and a metering method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
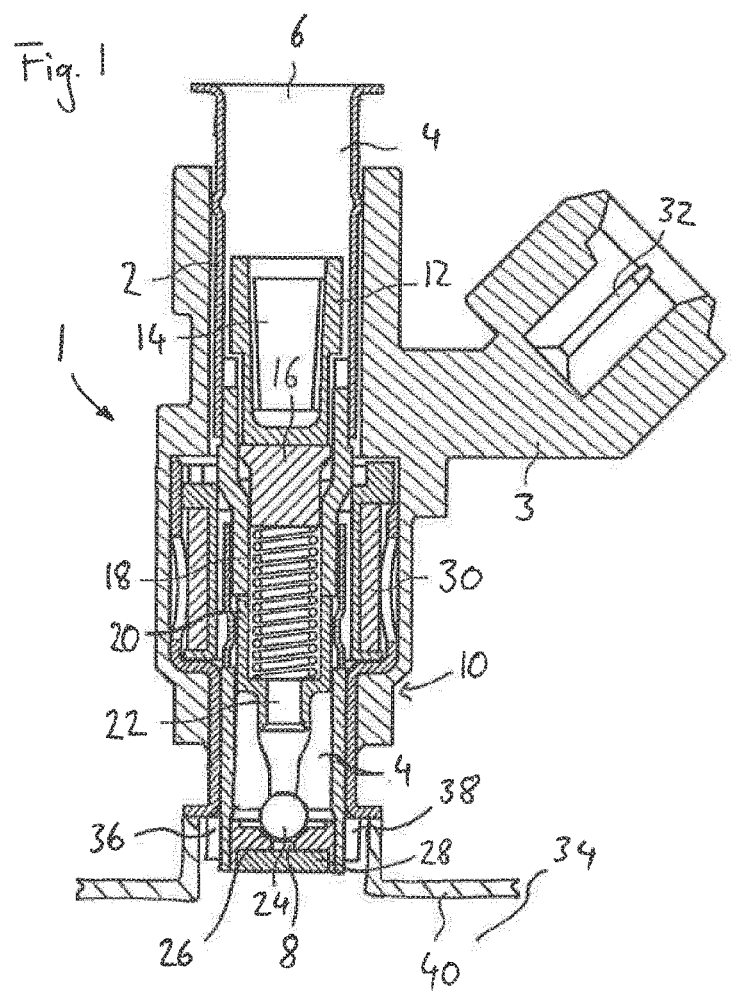
FIG. 1 shows a schematic illustration of a first embodiment of the inventive metering device.

Referring now to the figures of the drawing in detail and first, particularly, to FIG. 1 thereof, there is shown a schematic view of a metering device 1 for metering a reducing agent liquid into an exhaust gas stream of a combustion system of a motor vehicle. The invention is described in the following with reference to the specific embodiment of a urea injector, but it is not limited to that implementation. The metering device and the corresponding method are also suitable for metering water and/or aqueous solution for injection into a combustion chamber or an intake manifold in a combustion system.

The metering device 1 has an internal housing 2 which surrounds an essentially cylindrical cavity 4. The cavity 4 has at its upper end an inlet 6 for a liquid reducing agent, and at its lower end an outlet 8 for the liquid reducing agent. An external housing 3 partly surrounds the internal housing 2.

A shut-off device 10 in the form of a valve is arranged between the inlet 6 and the outlet 8.

A filter housing 12 with a filter 14 for filtering the reducing agent liquid is arranged in the cavity 4. In addition, a spring seat 16 with a restoring spring 18 is arranged in the cavity 4. The restoring spring 18 is under prestress between the spring seat 16 and a needle seat 20, which is mechanically coupled to a valve needle 22.

When the valve is not actuated, the valve needle 22 is in a closed position.

In the closed position, the valve needle 22 is pushed, with the ball 24 arranged on its tip in the direction of the outlet 8 in such a way that the ball 24 is pressed firmly against a seat 26 and closes off the outlet 8 with the nozzle plate 28.

The shut-off device 10 is actuated by means of an electromagnetic actuation apparatus 30 which has, in particular, a coil which can be energized via the electrical connection 32 and has the purpose of generating a magnetic field. If the coil is energized, the valve needle 22 is thus moved in the direction of the inlet 6 counter to the restoring force of the valve spring 18, and the ball 24 lifts off from the seat 26, with the result that reducing agent liquid can pass from the cavity 4 into the exhaust gas tract 34 through the outlet 8.

According to the first embodiment of the metering device 1 shown in FIG. 1, a first electrode 36 and a second electrode 38, via which an electrical current can be applied to the housing 2, are provided in the region of the nozzle plate 28, around the housing 2 and in electrical contact with the housing 2. The electrodes 36 and 38 are therefore short-circuited in the region of the nozzle plate 28 via the housing 2, and the housing 2 is heated in the region of the nozzle plate 28 by the flow of current. As a result, an increase in temperature is generated in this region, which increase is sufficient to prevent freezing of reducing agent liquid.

In this context, the electrodes 36 and 38 do not make contact with the exhaust gas pipe 40 but rather are electrically insulated with respect to the latter.

Figure 2:
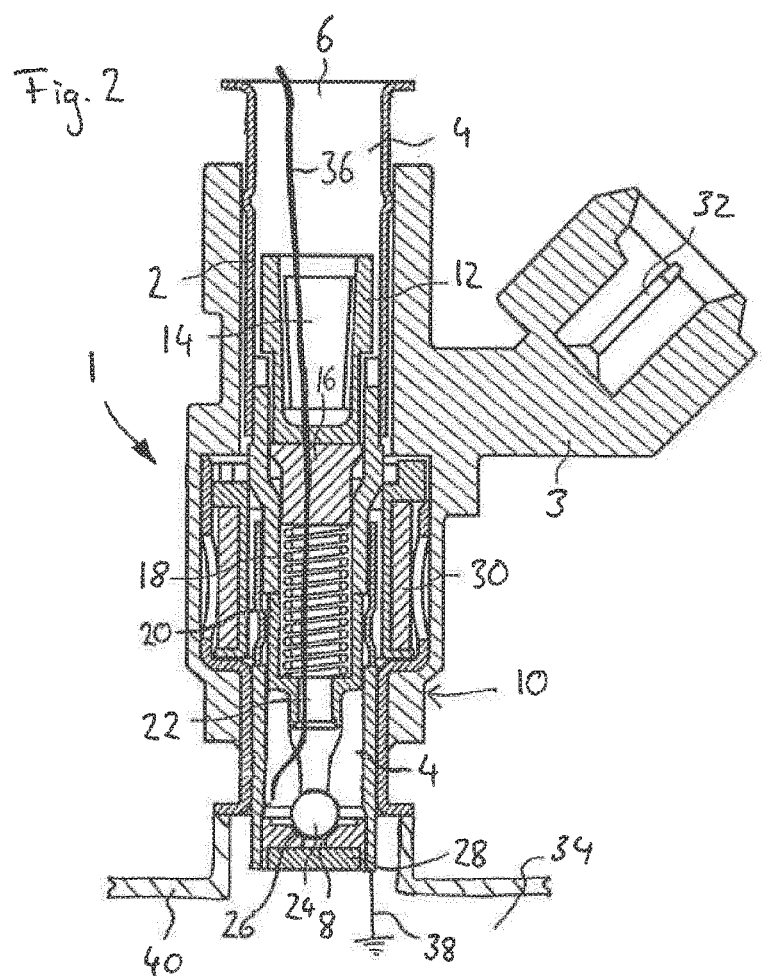
FIG. 2 shows a schematic illustration of a second embodiment of the inventive metering device.

FIG. 2 shows a second embodiment of the metering device 1, which differs from the first embodiment shown in FIG. 1 in that a first electrode 36 is led through the inlet 6 into the cavity 4 as far as the region of the nozzle, just before the outlet 8. The electrode 36 ends freely in the cavity 4, at the level of the valve needle 22. A second connection 38 connects the housing 2 to the vehicle ground.

In this embodiment there is provision to use the electrical conductivity of the reducing agent and to generate a flow of current through the reducing agent from the first electrode 36 to the second electrode 38. As a result, the reducing agent is heated directly in the region in front of the nozzle plate 28.

Figure 3:
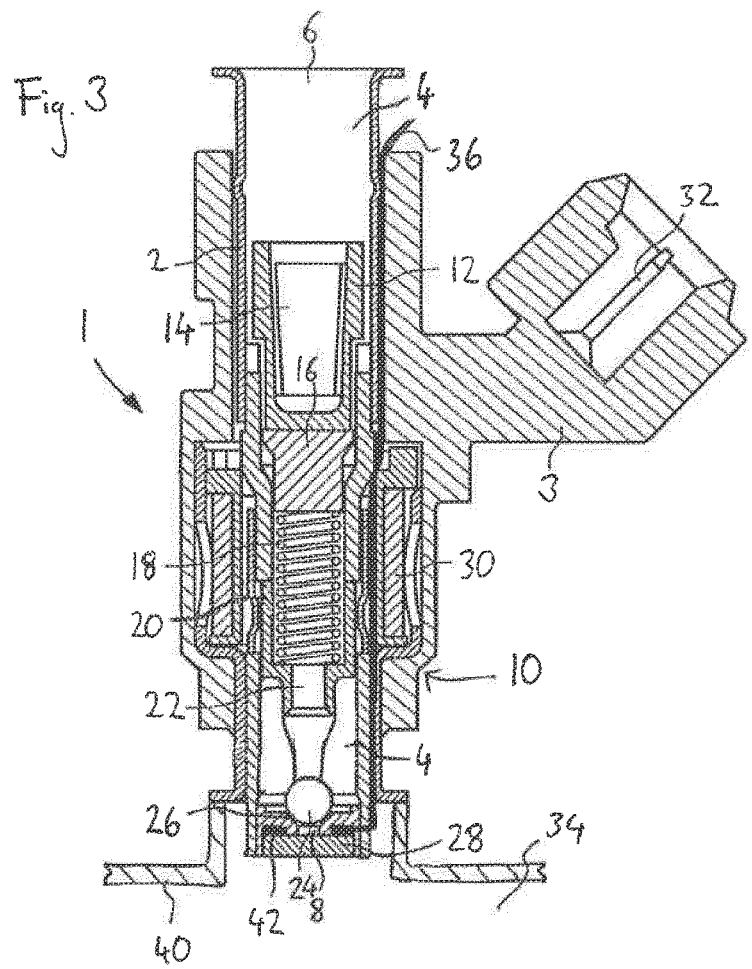
FIG. 3 shows a schematic illustration of a third embodiment of the inventive metering device.

FIG. 3 shows a third embodiment of the metering device 1, which differs from that shown above in that a heating element is arranged in the form of an annular heating pellet 42 on the nozzle plate 28, contact is made with which heating pellet 42 by at least one electrode 36. The electrode 36 is led here between the external housing 3 and the internal housing 2 as far as the tip of the metering device 1 in the region of the nozzle plate 28.

Figure 4:
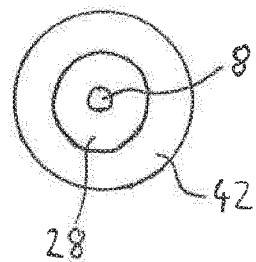
FIG. 4 shows a detail from FIG. 3.

FIG. 4 shows a plan view of the nozzle plate 28 from above, with the heating pellet 42 surrounding the outlet 8 in an annular shape.

The invention claimed is:

1. A metering device for metering water or an aqueous solution, the metering device comprising:
   an inlet and an outlet for the water or aqueous solution;
   a shut-off device arranged between said inlet and said outlet;
   a metering device nozzle at said outlet;
   at least one electrically operated heating element arranged in a region of said shut-off device, said at least one heating element arranged at said nozzle of the metering device; and
   said at least one heating element having a first electrode extending into the metering device as far as into a vicinity of said nozzle, and a second electrode making contact with a housing element of the metering device in a region of said nozzle, to form a current path from said first electrode to said second electrode through the water or the aqueous solution and said housing element.

2. The metering device according to claim 1, wherein said at least one heating element is formed by said housing element of the metering device at said region of the nozzle that is electrically insulated, and said housing element is short-circuit-heated by applying an electric current thereto.

3. The metering device according to claim 1, wherein the shut-off device of the metering device is a solenoid valve.

4. The metering device according to claim 1, wherein the aqueous solution is a reducing agent liquid and the metering device is configured for metering the reducing agent liquid into an exhaust gas stream of a combustion system.

5. An exhaust gas purification apparatus for a motor vehicle, the exhaust gas purification apparatus comprising:
   a container for holding and making available an aqueous solution being a liquid reducing agent;
   the metering device according to claim 1 for outputting the reducing agent into an exhaust gas stream; and
   a reducing agent line connected between said container and said metering device.

6. A method of operating a metering device for metering water or aqueous solution in a combustion system, the method comprising:
   providing the metering device having:
     an inlet and an outlet for the water or aqueous solution;
     a shut-off device arranged between said inlet and said outlet;
     a metering device nozzle at said outlet;
     at least one electrically operated heating element arranged in a region of said shut-off device, said at least one heating element arranged at said nozzle of the metering device; and said at least one heating element having a first electrode extending into the metering device as far as into a vicinity of said nozzle, and a second electrode making contact with a housing element of the metering device in a region of said nozzle, to form a current path from said first electrode to said second electrode through the water or the aqueous solution and said housing element heating the region of the shut-off device to a temperature above a freezing point of the water or aqueous solution at least when the combustion system is inoperative.

7. The method according to claim 6, wherein the heating step comprises electrically heating the shut-off device.

8. The method according to claim 6, wherein the heating step comprises locally heating in the region of the nozzle of the metering device.

9. The method according to claim 6, wherein the aqueous solution is a reducing agent liquid and the method comprises using the metering device to meter the reducing agent liquid into an exhaust gas of the combustion system.

\* \* \* \* \*